May 26, 1936.  E. A. STALKER  2,041,796

AIRCRAFT

Filed July 2, 1935  5 Sheets-Sheet 1

INVENTOR

Edward A. Stalker

*INVENTOR*
Edward A. Stalker

May 26, 1936. E. A. STALKER 2,041,796
AIRCRAFT
Filed July 2, 1935 5 Sheets-Sheet 5

FIG.14

INVENTOR
Edward A. Stalker

Patented May 26, 1936

2,041,796

UNITED STATES PATENT OFFICE 2,041,796

AIRCRAFT

Edward A. Stalker, Ann Arbor, Mich.

Application July 2, 1935, Serial No. 29,476

15 Claims. (Cl. 244—19)

My invention relates to aircraft and particularly to means of propelling them by low pressure jets, and to propulsive means utilizing the boundary layer. This application contains material in common with my prior applications filed October 25, 1935 and May 17, 1934 bearing Serial Numbers 695,149 and 726,111, respectively.

This application differs from that of Serial Numbers 695,149 and 726,111 in that it is concerned with the propulsion of aircraft of all types as well as of rotary winged aircraft. It differs from that of Serial Number 726,111 also in that it provides a broader concept or definition of the proper jet and wing proportions for low pressure jet propulsion for any type of aircraft.

One object of this invention is to provide an efficient means of propelling rotary wing aircraft with a low pressure fluid jet. A second object is to provide a low pressure means of propulsion for any aircraft by a fluid jet, the jet being the principal means of propulsion. A third object is to provide a means of propelling the aircraft which will utilize a principle of boundary layer energization to reduce the drag by the jet coincidently with the generation of a mass reactive force. A fourth object is to provide lower surface jets for balancing and controlling the aircraft.

Other objects will appear from the appended drawings and descriptions.

I attain the above objects by the means illustrated in the accompanying drawings in which—

Figure 3 is a fragmetary vertical section through the hub and stationary shaft along line 3—3 in Figure 4a;

Figure 4 is a fragmentary vertical section along line 4—4 in Figure 4a;

I am aware that it has been proposed to rotate the wings of helicopters and the like with high pressure jets. Such schemes as have been proposed, however, either use compressors of the positive type (reciprocating compressors, for instance) or explosive devices such as internal combustion engines discharging their gases through a nozzle; or else they utilize wholly improper nozzles or improperly associate them with the wing to be propelled. All their features bespeak high pressure jets.

The high pressure jet devices of propulsion have failed because of many defects. Aside from the inefficiency of a high pressure jet after it is produced, there is the problem of efficient production of the jet which has not been solved.

It is well known in the science of propulsion that a propulsive jet should have the same speed relative to the propelled body that the body has relative to the ground, but that the motions should be oppositely directed. Under this condition the discharged fluid is left with no velocity relative to the ground and hence with no energy. All of it has then gone into the propulsion of the body. Neglecting internal losses such as friction in the fluid conduit, the efficiency of propulsion would be 100 per cent.

The wing tips were selected in the high pressure scremes for the nozzle location because of their high speed and because to get enough fluid through the type of wings employed very high fluid pressures were necessary. Propeller and helicopter wings are necessarily thin and narrow to satisfy aerodynamic conditions of efficiency. In particular, helicopter blades are especially thin and narrow. It was then quite natural to employ high pressure jets since only a very small conduit is necessary to conduct fluid to the nozzle at the blade tip. In fact, as far as I am aware, this seemed such an obvious solution to the problem that no other solutions have been proposed. The efficiency of the high pressure jet schemes are necessarily low because of the large ratio of jet velocity to tip speed of the wing, but the adherents of these schemes rely on the supposed simplicity of the device and the hoped for improvement in the efficiency of the means to produce the jet, such increase in efficiency of production to be used to offset the speed ratio loss. To date no such scheme has been practically successful.

It has not been previously discovered that it is possible with proper combinations of wing form, nozzle shape, and blowing means to produce low velocity jets capable of propelling the wings of aircraft, and that it is possible under these conditions to get the requisite amount of air or other fluid through the wing interior. It is not possible to merely use any of the high pressure means which have been proposed in the past. A unique combination of means is required.

The critical pressure which separates low pressure jets from high pressure jets is that which will produce the velocity of sound in the local atmosphere. There are several reasons why this velocity is critical.

A helicopter for good efficiency requires a wing having a high aspect ratio of the order of 20. Typical dimensions are a radius of 20 feet and a chord length of one foot. Furthermore, the wing should be as thin as possible. The thickest portion is near the hub for strength and the thickness is reduced as rapidly as possible outward along the span. Then a conduit formed inside the wing decreases rapidly in cross sectional area and at mid-span in the conventional wing is only a few per cent of the hub end minimum cross section. There is, therefore, no opportunity to expand the internal flow to a low velocity after it has entered the wing; and to get the requisite amount of air into the wing for high efficiency through the hub end of the wing the fluid velocity should approach the velocity of sound. This velocity cannot be exceeded without an increase in initial pressure which would also cause a pressure rise in the wing because of the lack of expansion volume within. The fluid would then issue from the slot with a pressure higher than atmospheric and the jet would expand vertically as well as rearward. Any vertical expansion represents a loss of propulsive effect and destruction of the lift of the wing. A wing could be propelled by vertical and rearward expanding jets but the propulsion would not be very efficient, although this is sometimes the type of propulsion proposed for high pressure jets.

Since the maximum obtainable velocity in the wing at atmospheric pressure is the velocity of sound the internal chordwise cross section should not be reduced until some of the jet fluid has been discharged. The discharge must be useful and therefore directed rearward. Therefore, I prefer not to reduce the wing cross section until some fluid is discharged, and I provide means to direct the discharge rearward, that is, toward the trailing edge of the wing. This is especially important where the discharge slot has a large spanwise extent because then the slot walls at the ends of the slot cannot offer any guidance to the fluid. Other means such as vanes within the wing should be used to eliminate a spanwise component of velocity in the jet. Such a component offers no propulsion and would be wasteful of energy.

As an aid in the use of low pressure jet propulsion I employ energization of the boundary layer on the wings.

When fluid flows across a body the velocity at the surface of the body is zero and it is some distance out from the body that the full velocity of the local stream is attained. If the body is curved the loss in energy due to friction along the forward portion is such that when the fluid reaches the locality where the body begins to contract in cross sectional area the flow leaves the body and a turbulent wake appears which increases the drag of the body greatly. The layer of air retarded by friction is called the boundary layer. If sufficient energy is added to the boundary layer it will not leave the surface but will follow smoothly along it with a consequent reduction of drag. The amount of energy needed is small in comparison with the reduction in drag. The process is called the energization of the boundary layer.

The boundary layer can be energized either by blowing along the surface rearward, preferably tangentially to the surface so as to accelerate the layer, or by drawing the layer into the wing. In both cases energy is added to the layer and in both cases the layer is suppressed.

A unique feature of this invention is that the propulsion jet is discharged along a substantial length of the wing span through a surface slot to energize the boundary layer and propel the wing.

Great care must be exercised in proportioning the jet cross section because the reduction in drag due to energizing the boundary layer may be entirely dissipated if the jet velocity is too high, as it will be if the jet cross section is too small. A high jet velocity increases the friction on the body surface and hence itself increases the drag. I proportion the discharge area so that the jet velocity is optimum to obtain the greatest reduction in drag.

The slots in the upper surface for boundary layer energization should be in the forward two-thirds of the wing chord since the rear one-third of the wing surface is practically flat. It is where the surface is appreciably curved that the slots are important.

If the slots and their jets are to be used to energize the boundary layer on a certain wing area, then the slots should be extensive spanwise across a major portion of this area.

The thicker the wing section the more significant is the use of boundary layer energization. In fact, the wing section can be made so thick that the flow does not follow the aft portion at all but separates from the wing at the locality of maximum thickness. A cylinder, for instance, can be regarded as a thick wing from which the flow separates at the locality of maximum thickness. The drag is then huge, but by boundary layer energization of the proper type the flow may be made to adhere to the surface and the drag is then low.

According to the theory underlying this invention $T_r$, the thrust required for a given wing area, is then equal to the difference of the normal drag and the reduction in drag due to boundary layer energization:

$$T_r = \frac{C_D}{C_L} W - C_{DP} \frac{\rho}{2} A V^2 \cdot 6t \left( \frac{V_j - V}{V} - \frac{V_j^2 - V^2}{4V^2} \right) \quad (1)$$

where
 $C_D$ = total drag coefficient
 $C_{DP}$ = profile drag coefficient
 $C_L$ = lift coefficient
 $A$ = wing area
 $W$ = weight of aircraft supported by the area $A$
 $V_j$ = velocity of the propelling jet
 $V$ = velocity of wing area $A$ relative to the air
 $t$ = thickness of the wing as a fraction of the length of the wing chord = relative thickness.

It is well known in the science of aerodynamics that $$C_D = C_{DP} + \frac{C_L^2}{\pi R} \tag{2}$$

where R is the aerodynamic aspect ratio of the wing and $\pi$ has its usual value of 3.14. The first term $C_{DP}$ is called the profile drag coefficient and depends chiefly on the viscosity of the air and the wing section; the second term is called the induced drag.

Using Equation (2), equation (1) may be written as $$T_r = \left(C_{DP} + \frac{C_L^2}{\pi R}\right)\frac{\rho}{2}AV^2 - 6tC_{DP}\frac{\rho}{2}AV^2\left(\frac{V_j-V}{V} - \frac{V_j^2-V^2}{4V^2}\right) \tag{3}$$

There is a jet velocity for which $T_r$ will be a minimum which may be found by differentiating Equation (3) with respect to $V_j$ and equating to zero.

$$\frac{dT_r}{dV_j} = 6tC_{DP}\frac{\rho}{2}AV^2\left(\frac{1}{V} - \frac{V_j}{2V^2}\right) = 0$$

$$V_j = 2V \tag{4}$$

The thrust available from the jet is quite closely $$T_a = \frac{\rho}{2}A_j(V_j^2 - V^2) \tag{5}$$

(Different conditions for the intake of air will alter the equation to some extent, but not sufficiently to alter the general conclusions), where $A_j$ is the cross sectional area of the jet at discharge. The thrust available must equal the thrust required, so $$A_j = \frac{\left(C_{DP} + \frac{C_L^2}{\pi R}\right)AV^2}{V_j^2 - V^2} - \frac{6tC_{DP}AV}{V_j+V}\left(\frac{1-V+V_j}{4V}\right) \tag{6}$$

and since $V_j = 2V$ $$A_j = A\left[\frac{C_{DP}}{3} + \frac{C_L^2}{3\pi R} - \frac{t}{2}C_{DP}\right] \tag{7}$$

The value of $C_{DP}$ is a function of wing section maximum thickness expressed as a fraction $t$ of the chord, according to well known theory, as $$C_{DP} = (0.01 + 0.01t + 0.1t^2) \tag{8}$$

Then $$A_j = A\left\{\frac{C_L^2}{3\pi R} + (0.01 + 0.01t + 0.1t^2)\left(\frac{1}{3} - \frac{t}{2}\right)\right\} \tag{9}$$

For many purposes the last term, $(0.1t^2)$, is small and can be neglected.

This is the preferred cross-sectional area of the jet at discharge. It remains however to define $C_L$ and this requires a discussion of operating conditions in a rotary wing aircraft.

A wing rotating about an axis normal to the span can be treated as in rectilinear flight if it is assumed to be concentrated at the two-thirds radius. This is well known in propeller theory. Thus $V_j$ at the two thirds radius can be taken as typical if the area is all assumed to have this velocity.

For an airplane all portions of the wing span normally have the same velocity and the equations are true for the propulsion of the wing through the air.

It can be shown that for steady horizontal flight of the wing that each portion of the wing should operate at the maximum value of the ratio of lift to drag, that is $C_L/C_D = $ maximum. For climbing flight it can also be shown that $C_L^3/C_D^2$ should be a maximum. By differentiation for a maximum it can be shown that for maximum lift drag ratio $$C_L = \sqrt{\pi R_a C_{DP}} \tag{10}$$

while for best climb $$C_L = \sqrt{3\pi R_a C_{DP}} \tag{11}$$

Thus the value of $C_L$ can be represented in general as $$C_L = \sqrt{N\pi R_a C_{DP}} \tag{12}$$

where N is selected according to the condition of flight of the wing. Then $$\frac{A_j}{A} = (0.01 + 0.01t)\left(\frac{1}{3} + \frac{N}{3} - \frac{t}{2}\right) \tag{13}$$

N can exceed the value of 3 of Equation (11) as for instance when the wing operated near maximum lift coefficient and can be less than 1, the value given by Equation (10). The preferred range however is from 1 up until $C_L$ equals the maximum value. The most frequently used range in a helicopter is from 0.90 to 6.0. It is not always appreciated that helicopter wings sometimes will attain to maximum lift coefficients, but this will frequently be the case. For instance in autogiros flying at maximum speed, in order to maintain lateral balance the retreating wing descends rapidly and the angle of attack measured against the relative wind mounts to the value corresponding to maximum lift. This condition represents the limiting top speed of the aircraft. In rigid rotary wing aircraft the maximum lift coefficient would be obtained by other means than the wing flapping. In the limit the value of maximum $C_L$ can attain $4\pi$ as is well known. The value of $4\pi$ is obtainable with boundary layer energization. Without this effect the value of maximum $C_L$ has a value of 1.0 for a flat plate or symmetrical wing section. A more common value in use is 1.2 for a cambered wing section.

For flight with these values of $C_L$ $$A_j = A\left\{\frac{1.44}{3\pi R} + (0.01 + 0.01t + 0.1t^2)\left(\frac{1}{3} - \frac{t}{2}\right)\right\} \tag{14}$$

and $$A_j = A\left\{\frac{16\pi}{3R} + (0.01 + 0.01t + 0.1t^2)\left(\frac{1}{3} - \frac{t}{2}\right)\right\} \tag{14a}$$

In addition to providing an adequate thrust, the jet size and velocity should be selected to provide the best efficiency. There are for instance, losses within the wing which should be kept to a low value. Although the efficiency problem in all its detail is very complicated I have found that the efficiency can be represented quite accurately as follows:

The useful energy is the product of thrust and velocity of flight. The energy put into the jet is proportional to the product of thrust and additional velocity added to the jet mass plus the energy losses within the wing which can be expressed closely as $q_1V^3$. That is, the efficiency is $$\eta = \frac{TV}{T[V + m(V_j - V)] + q_1V^3} \tag{15}$$

$$\eta = \frac{1}{1 + m\frac{V_j-V}{V} + \frac{q_1V^2}{T}} = \frac{1}{1 + m\frac{V_j-V}{V} + \frac{q_1V^2}{q_2V_j^2}}$$

since the thrust T can be written as proportional to $V_j$ as a close approximation. Introducing the numerical values for the coefficients yields $$\eta = \frac{1}{1 + 0.08\frac{V_j - V}{V} + 0.12\frac{V^2}{V_j^2}} \quad (16)$$

The value of $V_j$ for maximum efficiency is found by differentiating the equation for $\eta$ and equating to zero after the manner of the calculus. Thus $$\frac{d\eta}{dV_j} = \frac{0.08}{V} - 0.24\frac{V^2}{V_j^3} = 0$$

whence $$V_j = 1.44V$$

It then appears that for considerations of energy expenditure that the jet velocity should be somewhat lower than that based upon force conditions (thrust and drag) and the phenomena outside the wing only. Different conditions of design or operation, however, will lead to requirements varying between best efficiency and best thrust conditions. For instance, while flying at maximum lift coefficient the thrust is more important than efficiency. On the other hand while the airplane is cruising efficiency is most important in the ordinary airplane.

Introducing the value of $V_j$ from Equation (17) into Equation (6)

$$A_j = A\left\{\frac{0.93C_L^2}{\pi R} + (0.93 - 0.45t)(0.01 + 0.01t + 0.1t^2)\right\} \quad (18)$$

or writing $$C_L = \sqrt{N\pi R C_{DP}}$$

$$A_j = A\{(0.93 + 0.93N - 0.45t)(0.01 + 0.01t + 0.1t^2)\} \quad (19)$$

Equations (18) and (19) state the values of $A_j$ for $V_j$ for substantially maximum efficiency.

For the condition of $V_j = 2V$, Equation (1) becomes $$T_r = \left[\frac{C_L^2}{\pi R} + C_{DP}\left(1 - \frac{3t}{2}\right)\right]\frac{\rho A V^2}{2} \quad (20)$$

For a given airplane design, only so much thrust will be available from the given engine, and R and $t$ must be selected to give the best results. Since $T_r = $ constant, $dT_r/dR = 0$ and the derivative of Equation (10) with respect to R produces $$\frac{dt}{dR} = \frac{C_L^2}{\pi R^2(0.01 + 0.05t + 0.3t^2) - \frac{1}{2}(0.01 + 0.01t + 0.1t^3)} \quad (21)$$

from which it is seen that the rate at which $t$ should change with R is inversely proportional to $R^2t^2$ taking only the highest powers. In any case the rate is a function of the product $Rt$.

From Equation (20) it appears that the thrust required decreases with an increase in aspect ratio R and increases with an increase in wing thickness since $C_{DP}$ is a function of the thickness ratio $t$. Because of the handicap of a small propeller or jet diameter, the propulsive scheme is not suitable for small values of R because the boundary layer energization does not affect the induced drag but only the profile drag. Thus for certain low values of R no possible amount of reduction in profile drag will compensate for the high drag due to a low value of R. There is therefore a value of the product $Rt$ below which it is impracticable to go. I find that $Rt$ should be larger than 0.50 and the upper limit is set by $t = 1$ and the greatest aspect ratio that may be built for an economical weight. At the present this aspect ratio is of the order of 25 but refinements in materials may extend this limit.

When a tapered wing is employed the product $Rt$ should be based on the wing section at the mean aerodynamic chord since as is well known in the science this wing section is representative of the aerodynamic properties of the wing as a whole. Methods of determining the mean aerodynamic chord are to be found in texts and handbooks such as Aviation Handbook by Warner and Johnson. A simple method which I prefer for the present purpose is to take a weighted average of the values of $t$ at the various chords at stations along the span, the values of $t$ being weighted according to the length of their respective chords.

There are a number of critical conditions setting off the low pressure propulsion from high pressure propulsion. One is the specific proportions of the cross-sectional areas of the jet passage at various localities along its length and another is the velocity of sound. In particular it can be shown that for low pressure propulsion the area of the jet exit ($A_j$) should preferably not be larger than the minimum cross-section of the jet while for high pressure jet propulsion the area of the jet exit must always be far larger than the minimum area. Also the low pressure jet should fill the cross-section of the wing interior to the maximum extent permissible by structural considerations.

Figure 1:
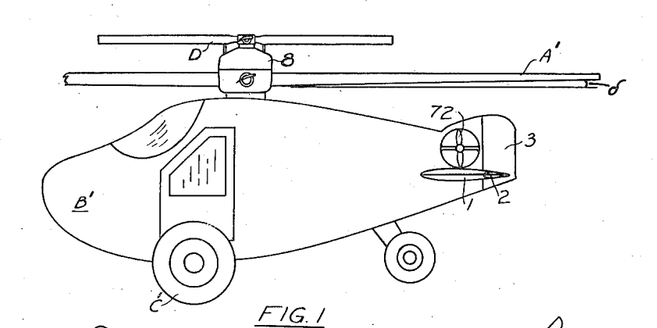
Figure 1 is a side elevation of the aircraft.
Figures 1A, 1B, 2:
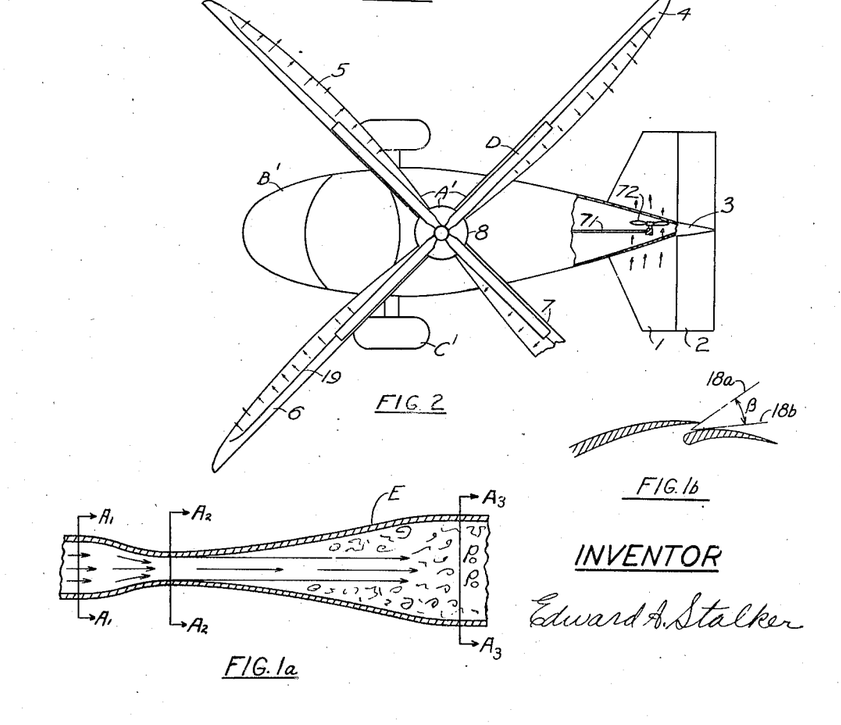
Figure 1a relates to the theory.
Figure 1b is a fragmentary section of the walls defining a discharge slot.
Figure 2 is a fragmentary plan view of the aircraft.

Consider the flow depicted in Figure 1a for a frictionless (assumed) fluid. The initial total pressure $p_1$ is 13 pounds per square inch gage or 27.7 pounds per square inch absolute. The minimum constriction possible to pass the maximum mass of air is realized when the pressure $p_2$ drops to 0.527 $p_1$ according to hydrodynamic theory. At this pressure of $p_2$ the velocity $V_2$ at the constriction is equal to the velocity of sound under the conditions which prevail at the throat. The velocity of sound "$a$" is given by $$a = \sqrt{\frac{1.41p}{\rho}} = 1100\sqrt{1 + \frac{\theta}{460}} \quad (22)$$

where $\theta$ (theta) is the temperature in degrees Fahrenheit. This equation is for air of moderate humidity. It will be readily apparent that the speed of sound does not vary very much for small temperature changes, such changes as would result for moderate compression ratio. A change in temperature of many degrees would change the value of "$a$" only slightly because the temperature is divided by such a large term as 460 and in addition is under the radical.

Consider the circular tube shown in section in Figure 1a, at whose entrance $A_1$ the total pressure is 27.7 pounds per square inch absolute (13 pounds per square inch gage). The tube is constricted at $A_2$ to the minimum section for passing the maximum mass of fluid. At a pressure of 27.7 the mass density is 0.00370 if the air is compressed adiabatically from standard mass density of $\rho_0 = 0.00237$. At the throat of the tube (at $A_2$) the density has decreased to 0.634 of 0.00370 or 0.00235 which is the same practically as the standard density air. The velocity at the throat will be 0.911 times the velocity of sound of the fluid at pressure 27.7 or 1100 feet per second. It is to be remembered that there are maximum discharge conditions and no further constriction of section $A_2$ will give a higher mass discharge per unit of time. It is to be noted then that all the energy in the air at section $A_1$, potential energy plus kinetic, is now in the form of kinetic energy of the flow. Thus the pressure and density at the throat are substantially the same as at the atmosphere into which the jet is discharging. Since the fluid is at the same pressure as the outside atmosphere no further expansion of the fluid is possible so that an expansion tube or diffuser E added to the throat will not decrease the velocity of the jet in the manner of an expansion.

The above conclusion may also be reached in the following manner. If the air at the cross-section $A_2$ contains all the energy as kinetic energy and the density and velocity are a maximum it is not possible to slow up the jet except by destroying the energy. Such a destruction would take place with a real fluid having viscosity if a flared tube or diffuser such as E in Figure 1a were added. Because of friction mixing at the boundary of the jet with the dead air in the space F would occur so that the moving mass at section $A_3$ would be larger while the velocity would be low for two reasons: some of the kinetic energy would go into motivating the additional mass but more than an equal amount would be lost as heat through the mechanism of turbulence. The loss of energy due to such turbulence is notorious and is usually termed a shock loss.

The same mass of fluid passes each cross section of the tube so that $$\rho_1 A_1 V_1 = \rho_2 A_2 V_2 \qquad (23)$$

and since $$\rho_2 = 0.634 \rho_1$$

and $$V_2 = 0.911 a_1 = 1100 \text{ feet per second}$$

$$A_2 = \frac{A_1 V_1}{1100} = \text{minimum permissible area} \qquad (24)$$

Since there is no gain in expanding the tube the area $A_j$ in a wing should then be equal to $A_2$ and so $$A_j = A_2 \geq \frac{A_1 V_1}{1100} \qquad (25)$$

which states the preferred ratio of the jet inlet area to the jet discharge area. Thus the condition that $A_2 = A_j$ is a critical condition. If the jet area $A_j$ is made larger than the minimum cross-sectional area $A_2$, losses immediately ensue due to turbulence. The area ratios as stated define a boundary between the low pressure jet propulsion and high pressure jet propulsion because for any higher pressure than 27.7 the area $A_j$ must be larger than $A_2$ to expend the jet pressure and prevent lateral spreading of the jet.

It is of course possible with low pressure propulsion to violate the boundary and tolerate some loss. For instance if the area $A_j$ is 2.0 times the area $A_2$ of the wing about 50 percent of the original energy will be dissipated in turbulence. This would be about the maximum loss that could be tolerated and $A_j = 2.0 A_2$ is taken as an upper limit to bound the useful régime of operation.

For satisfactory efficiency the wing must be reduced quite rapidly in thickness from the hub outward. Such a reduction reduces the cross-sectional area of the wing to such an extent that the cross-sectional area of the passage within the wing is continuously diminishing from the hub outward. Then if $A_j$ is to be equal to the section area $A_2$ at the hub and this area $A_j$ is to flow full of fluid, the slot 19 (or 18) Figures 5 and 5a defining the area $A_j$ must start quite near the hub. Then the combined area of the passage within the wing at any radius plus the portion $\Delta A_j$ of the area $A_j$ up to the radius should equal the area $A_2$. In this way $A_j$ is assured of enough fluid to fill the exit.

Figure 3:
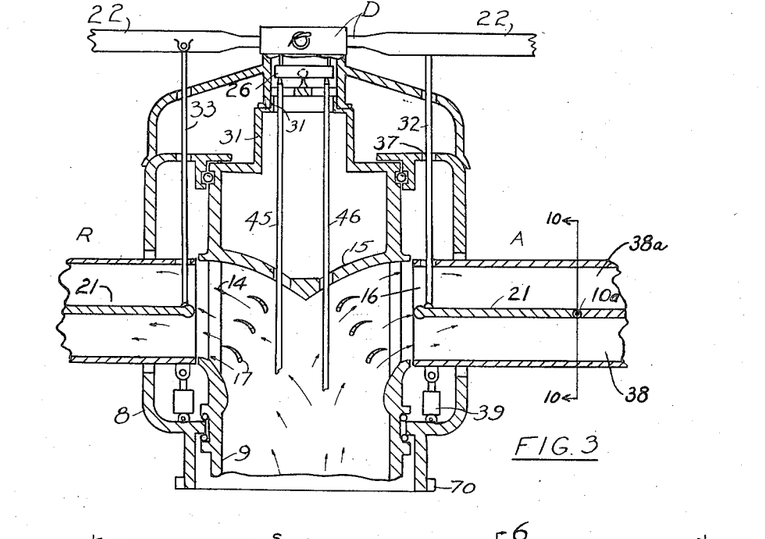
Figure 5:
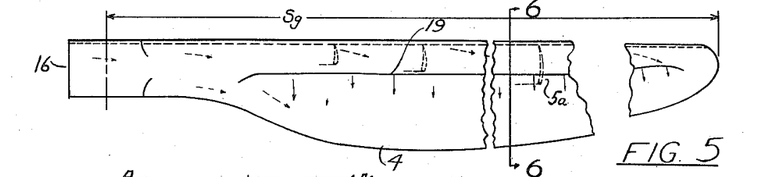
Figure 5 is a fragmentary top plan view of a wing.
Figure 5A:
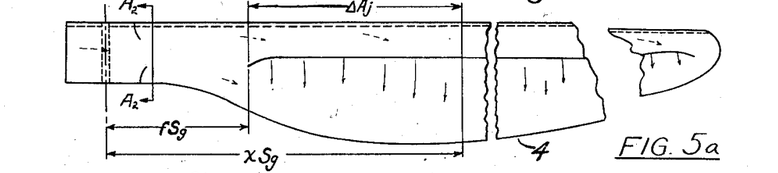
Figure 5a is the bottom plan.
Figure 6:
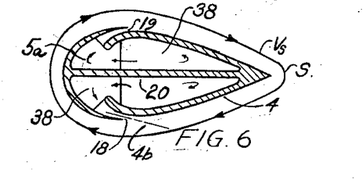
Figure 6 is a vertical cross section along line 6—6 in Figure 5.

Thus in Figures 3, 5a, and 6 for instance, the cross sectional area of the passages 3, 8 and 38a plus the portion of the slot area $\Delta A_j$ up to the section at $XS_g$ (the fraction X of the span $S_g$) equals the area $A_2$ of the passage. This may be stated as $$t = \frac{A_2 - \Delta A_j}{kc^2} \qquad (26)$$

since the cross-sectional area of the wing taken chordwise can be written as $ktc^2$. The portion $\Delta A_j$ of the total area $A_j$ up to the radius $XS_g$ is $$\frac{XS_g - fS_g}{S_g - fS_g} A_j \qquad (27)$$

where $f$ defines the beginning of the slot as a fraction of the span $S_g$ out from the hub, and so $$t = \frac{A^2 - \frac{X-f}{1-f} A_j}{kc^2} \qquad (28)$$

Since $c^2 = A/R$ where A is the area of one wing and R is the aspect ratio, and $A_j = A_2$ $$t = \frac{RA_j 1 - \frac{X-f}{1-f}}{kA} = 1.4 R \frac{A_j}{A} 1 - \frac{X-f}{1-f} \qquad (29)$$

for a rectangular wing or one which is substantially rectangular. Any wing can also be represented by a rectangular wing having the same span and the average chord of the real wing. From Equation (7) substitute the values of $A_j/A$ whence $$t = 1.4 R (0.01 + 0.01 t) \left[ \frac{1}{3} + \frac{N}{3} - \frac{t}{2} \right] \frac{1-X}{1-f} \qquad (30)$$

Solving this equation for $t$ gives $$t = \frac{0.014 R \left( \frac{1}{3} + \frac{N}{3} \right) \frac{1-X}{1-f}}{1 - 0.014 R \frac{1-X}{1-f} \left[ \left( \frac{1}{3} + \frac{N}{3} \right) - 0.005 \right]} \qquad (31)$$

This equation shows that R and $t$ are directly related and the greater the aspect ratio the greater should be $t$. The value of $k=0.72$ has been inserted in Equation (31). This value is well known in connection with airfoil section geometry and can be found in an aeronautical handbook. The value N depends on the condition of flight, whether the wing is operating at best climbing angle, best ration of L/D or at other values of $C_L$. Its value has been previously discussed.

If the slot 18 (or 19) begins at $f = \frac{1}{3}$ the thickness $t$ for $N=3$ at the two thirds radius $(X = \frac{2}{3})$ will be 0.23 for $R=20$. The thickness $t$ at the hub would be 0.597 assuming that the wing section is continued up to the hub with a constant chord.

Since the jet passage should occupy the major portion of the chordwise cross-section of the wing at its axis end, that is near the center of the aircraft and since the wing section should diminish in area outward it can also be said that the passage should occupy a major portion of the wing interior.

Fluid flowing along a surface curved from the flow tends to leave the surface due to centrifugal force but is restrained by the pressure of the atmosphere. That is the fluid in tending to leave the surface produces a low pressure region at the surface so that the atmospheric pressure is unbalanced. This unbalance restrains the centrifugal force. If the body surface is appreciably curved as in a wing section fluid flowing at a velocity equal to or greater than the velocity of sound will tend to leave the surface in spite of the atmospheric pressure because then the dynamic pressure of the jet is greater than atmospheric pressure. Hence the velocity of sound is again a critical velocity.

The velocity of sound is produced by a static pressure of 13 pounds per square inch gage and no initial velocity, or by a lesser static pressure and a certain initial velocity. That is the total pressure dynamic plus static of 13 pounds per square inch will produce the velocity of sound. The total pressure as is well known is given by $$\frac{\rho V^2}{2} + p$$

where the first term is the dynamic and the last term the static pressure. Thus it is proper to speak of a jet as being a low pressure jet either on the basis that it originates in a volume of fluid at low static pressure and negligible dynamic pressure or vice versa. A jet is properly classed on the basis of the total pressure. Hence a low pressure jet is one whose total pressure is equal to or less than 13 pounds per square inch gage.

It is desirable that the cross-section of the wing at the locality of the control valve be large enough to keep the fluid velocity below the velocity of sound so that there will be no large fluid losses arising from the failure of the fluid to follow the contour of the valve 21. The loss would be of the same type as the loss accompanying the failure of the relative wind to follow the wing contour.

To recapitulate low pressure jet propulsion is characterized by such a pressure that the maximum velocity of flow does not exceed the velocity of sound; that the cross-sectional area of the jet exit should not exceed the minimum cross-sectional area of the jet passage within the wing and the minimum area should fill the major portion of the cross-sectional area of the chordwise cross-section of the wing; that the preferred distribution of the wing thickness should lie between definite or critical values.

The pressures I employ are of such a magniture that they may be created by ordinary blowers which rely on accelerating the air or gas rather than by changing its volume within the pump before releasing the charge. The pressures also are not dependent on subsequent heating of the charge.

This invention also combines a number of unique solutions to the direct lift aircraft problem so that the whole is an organic one, all the mechanisms cooperating to provide a stable and controllable flying machine. If the aircraft is an organic whole in flight, it must pass the following tests. The machine may be considered as suspended at a point which is the juncture of all three space axes. An aircraft has freedom to move along these axes in any manner and is also free to turn about them in any manner. That is, the aircraft has six degrees of freedom—three translations and three rotations are possible. Any of these motions may be of a general type, that is, not necessarily uniform but accelerated, and components of all six motions may occur simultaneously.

If the aircraft is an organic whole as regards its stability, there must be restoring moments arise when the aircraft is disturbed. Consider, then, to be explicit, a helicopter and let it be disturbed by a moment tending to tip up the front edge of the disk area swept by the rotating wings. The aircraft immediately tilts laterally due to gyroscopic action. If the aircraft is an organic whole as regards stability the aircraft must create moments tending to oppose both the initial and the gyroscopic moments and restore the aircraft to its original position. There must also be stability about the vertical axis. This is usually called directional stability or stability in yaw.

If the aircraft is an organic whole as regards control, it must be possible to direct the aircraft in any direction which calls for the ability to execute a rotation about any axis in any sense. In the case of the helicopter, for instance, it must be possible to yaw, pitch and roll the aircraft while stationary or in vertical descent—as well as during motion in any other direction. It will then be possible to maintain balance about all three axes.

Finally, if the aircraft is an organic whole as regards both balance and control, it must be possible to execute a maneuver about and along one axis without losing balance about another axis. Consider again the case of the helicopter and move the control stick so that the airplane pitches up at the nose. The gyroscopic moment at right angles to the pitch must be balanced or suppressed. This balance must exist whether the aircraft is stationary or moving horizontally or vertically. Evidently to achieve both balance and control as described the aircraft must be highly organized.

This invention presents a direct lift aircraft as an organic whole as regards stability, balance and control.

One well known theory of wing lift is the circulation theory according to which the flow about a wing section can be resolved into a circulation about the section and the translational velocity of the wing. The circulation is defined as the integral of the velocity $V_s$ (Figure 6) along the closed curve S. Any curve will do as long as it incloses the wing section. The wing lift per foot of span is then $$L_1 = \rho V \int_s V_s ds$$

The circulation is usually called $\Gamma$ (gamma) and so the lift can be written $$L_1 = \rho \Gamma V$$

An artificial circulation can be induced about a wing by blowing out a slot such as 18 in Figure 6. Since this slot is in the lower surface and directed rearward its jet induces a negative circulation which reduces the lift of the wing. The lower surface slot is then useful in reducing the lift of the advancing wing in a helicopter or to exert control moments on the aircraft. This is a unique feature of this invention.

In Figure 1 the airscrew or, as I shall call it, the wing system is A', the fuselage or body is B'. The landing gear is C'. The stabilizer and elevator are indicated by the numerals 1 and 2 respectively, while the rudder is 3.

Viewing Figures 1 to 5 together it will be noted that the wings 4, 5, 6, and 7 are carried by the hub 8 and that it is mounted rotatably on the stationary shaft 9 by ball bearings. The structure to support and hold the shaft 9 stationary in the body B may be of any suitable character known in the art and forms no part of this invention. The wings are hollow and each is hinged on a pin 10 for vertical oscillation.

Figure 14:
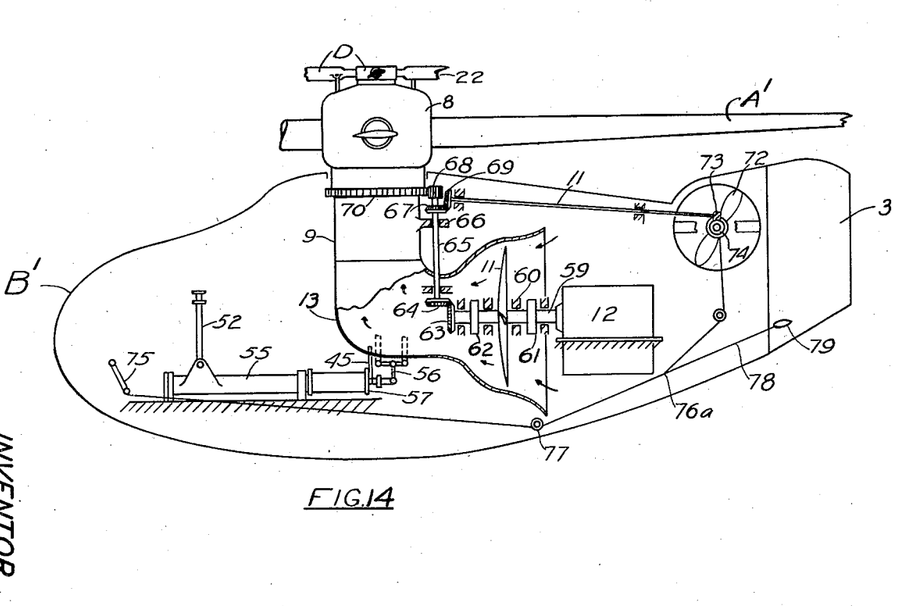
Figure 14 is a fragmentary side elevation of the wings and fuselage to show the relation of shaft, blower, and directional airscrew. It is shown as though the fuselage covering were transparent.

Fluid, preferably air, is blown up the inside of the shaft 9 by a blower 11 shown in Figure 14 and driven by the engine 12. The shaft 9 is connected to the discharge side 14 of the blower by the curved portion 13 of shaft 9. The flow proceeds at a low velocity up the shaft 9 because of the large cross section which keeps low the friction losses with the walls. At the level of the wings, Figure 3, the curved partition 15 and the vanes 17 encircling the shaft deflect the flow into the open ends 16 of the wings.

A large volume of air is needed within the wing because of the low pressure and the long discharge slots 18 and 19 shown in the wing plans of Figures 5 and 5a. It is also desirable to keep the cross section of the root sections of the wings small to keep their resistance low because they compensate for their drag with very little lift.

The form of the slots is shown in Figure 6 which is a chordwise cross section of the wing. The slots are formed with a well rounded entrance and their walls direct the flow toward the trailing edge. Within the wing the partition 20 extends from the root to the tip and forms a part of the structure.

Figure 4:
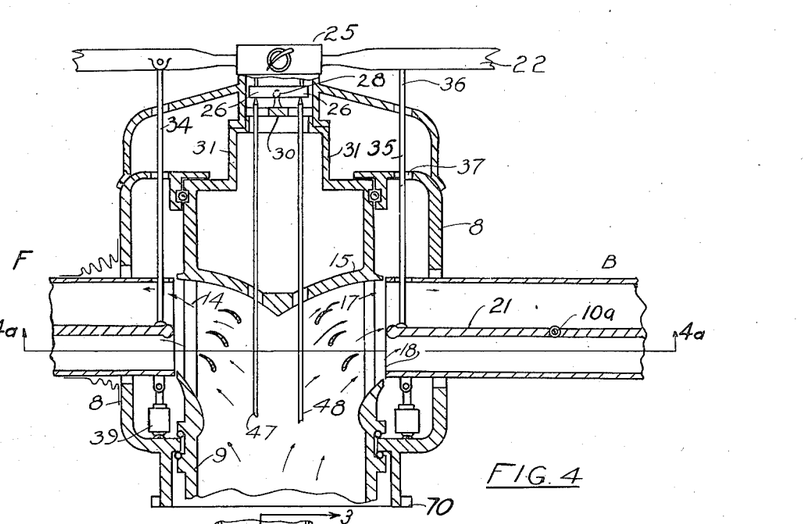
Figure 4A:
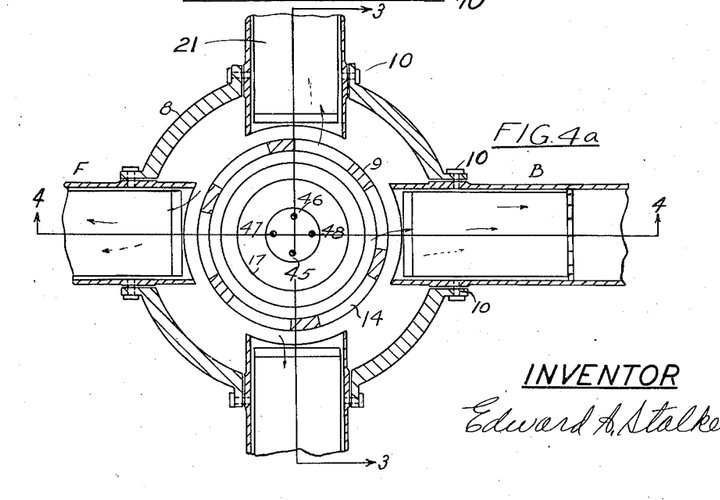
Figure 4a is a horizontal section through the hub along line 4a—4a in Figure 4.
Figure 7:
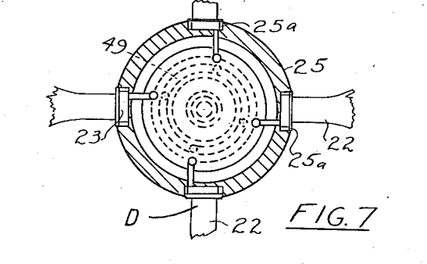
Figure 7 is a fragmentary horizontal section through the hub of the control airscrew D.
Figure 8:
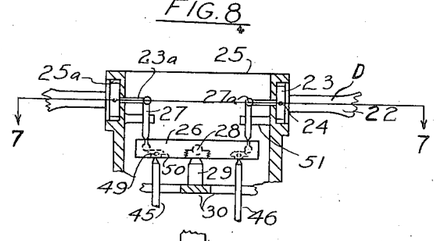
Figure 8 is a fragmentary vertical part section through the hub of the control airscrew and the supporting fulcrum.
Figure 9:
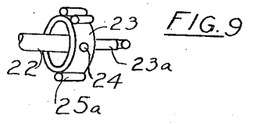
Figure 9 is a perspective view of the blade root and its ring for rotating the blades.
Figure 10:
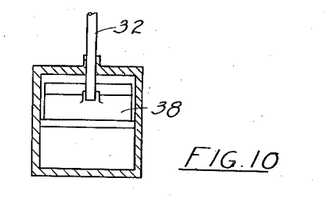
Figure 10 is a vertical cross section through the wing root to show the valve. It is taken along line 10—10 in Figure 3 but with the valve tilted upward rather than horizontal as in Figure 3.

The wing system has an inherent unbalance laterally because the advancing wing has a higher velocity relative to the wind than the retreating wing. It is desirable to annihilate this unbalance and it is particularly desirable to accomplish this automatically for all ratios of peripheral to forward speed. It is this ratio that determines the degree of lift dissymmetry. Hence the automatic means must be sensitive to changes of this ratio as well as the difference between the wind speed for advancing and retreating wings. The problem posed is solved by the placement of another airscrew horizontally rotatable about the axis of the main shaft 9. In Figures 3 and 4 the airscrew D has blades 22 which I designate as control blades to distinguish them from the main lifting wings. Other features are illustrated in Figures 7, 8, and 9. In these figures it will be observed that the blades are hinged within a ring 23 for free vertical oscillation about the pivot 24. The ring is mounted in the hub 25 on rollers 25a so that it may be rotated to change the pitch of the blade. Arms 23a extending inward from the rings 23 are attached to a disk block 26, which I call a lever, by ball and socket joints 27a and links 27. The lower ends of 27 are also balls socketed in the lever to produce universal connections. In turn the lever is mounted on the ball 28 so that it may wabble or tilt in any direction. The ball is formed on a shaft 29 supported as an integral part of a cross bar 30 of the housing 31 resting stationary on the end of shaft 9.

Figure 11:
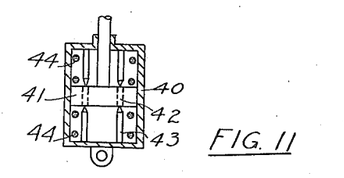
Figure 11 is a vertical section through a shock absorber.

In addition to upsetting moments from the difference of velocities, there are upsetting moments from gyroscopic forces if the wings have any rigidity in their connection to the hub 8. For the wings to tilt the aircraft rigidity must be present at least in the plane of the tilting moment, and I prefer to have an appreciable degree of rigidity in all the wings. The shock absorbers 39, Figures 3 and 4, provide the rigidity. These are designed to supply substantial freedom to the blades for a few degrees of vertical oscillation. I prefer a value of about 2 degrees of vertical oscillation. I prefer a value of about 2 degrees but the functioning is not limited to this value. The shock absorber is shown in section in Figure 11 and consists of a cylinder 40 housing the piston 41. On one of the diameters of the piston are two holes 42 extending through to the faces. In line with these holes are four pins 43, two for each cylinder end and of a diameter somewhat smaller than the holes 42. The whole cylinder is filled with liquid. When the piston is moved in either direction the fluid flows through the holes 42 and practically no resistance is offered to the motion. In proceeding further the piston approaches the pins 43 and they eventually pass into the holes 42 and almost restrict the flow therethrough. In this régime of action the device functions as a shock absorber and will dissipate energy in forcing a flow through the holes. After further movement the piston encounters the springs 44 shown in cross section. They are very stiff and serve to absorb shock and bring the piston to a stop.

The small degree of vertical freedom allowed the wings spares the fuselage and its occupants from jars due to local gusts such as might hit one wing tip only. In a maneuver or gust that is very rapid the wings are saved from shock stresses by the shock absorber and the wings may therefore be built lighter.

Assume that a gust pitches the aircraft up at the nose, a positive pitch. Due to the rigidity of the wings there will be a rolling moment at right angles because of the inertia of the blades. Assume in Figure 3 that the section is viewed from the back and that the rotation is as indicated by A and R. A positive pitch will cause the advancing wing A to dip. At the same time the wing 22 above will also dip but it will not exert any moment on the aircraft because of the articulation to the hub. The wing, however, must roll the whole airplane of large inertia so that practically the control blade may be considered as dipping relative to a stationary wing. Its motion will be that quick relatively. When the blade 22 goes down it opens the valve 21 to a greater flow out the upper slot 19 which generates enough additional lift to restrain the gyroscopic roll. On the other hand the retreating wing tends to rise and if the phenomenon is traced it will be found that the valve 21 is closed by the control blade sufficiently to suppress the flow to the upper slot and augment the flow to the lower so that the gyroscopic moment on the wing is suppressed. Since the wings and blades are symmetrically disposed about the axis, the gyroscopic moments will be balanced for any action of the aircraft, be it a pitch or a roll that disturbs the aircraft.

It is desirable that it be possible to tilt the aircraft when hovering or flying vertically. Ordinary ailerons on fixed wings are ineffective when there is no flow rearward past them. I control the aircraft manually by altering the pitch of the blades 22. If I wish a roll I increase the pitch of the retreating blade 22 and decrease the pitch of the advancing blade. For a negative roll, the pitch is reversed. I arrange the mechanism for this purpose so that as each control blade approaches or leaves the lateral positions the pitch is gradually changed and there is no difference in pitch between the front and back blades. Figures 3, 7, and 8 will make the operation of the mechanism clear.

The pilot may tilt the lever 26 about any axis passing through the ball 28 by the rods 45 and 46 which control the lateral tilting and two similar rods 47 and 48 shown in Figure 4 to control the longitudinal tilt. These rods attach to a plate 49 carried in a recess 50 on the under side of the lever. The lever rotates about the ball 28 being carried around by the lugs 51 bearing on the links 27. The recessed plate is held stationary by the rods 45 to 48 which bear on cross bars 30 of the housing 31. See Figures 3 and 4. In tilting the lever rotates the ring 23 and changes the pitch of opposite blades differentially because the arms 23a are all attached to the trailing edge side of the rings. If the lever is not tilted fore and aft the blades will resume normal and equal pitches in the front and back positions. If I wish a positive roll I decrease the pitch of the retreating blade and increase the pitch of the advancing blade. Then the retreating blade will dip and open wider the valve 21 so as to admit more fluid to the upper slot for increasing the lift of the retreating wing. The valve 21 of the advancing wing will further restrict the flow to the upper slot and cause the wing to dip. The moments of the lift will then roll the aircraft. Similar arguments will follow for a pitch, or a combination of a pitch and roll. It is only necessary in this case to tilt the lever about an axis oblique to the plane of symmetry of the aircraft.

It is important to observe that by this method of control the blades 22 at right angles to the induced moment are still able to correct the gyroscopic moment which will try to tilt the aircraft at right angles to the induced one. For instance if a positive roll is executed the nose of the aircraft will tend to tilt down. The front blade 22 will dip and increase the lift of the forward wing, the back blade will rise and decrease the lift of the rear wing; the two wings will then experience lift changes which will keep them horizontal. The control does not interfere with the automatic correction of the gyroscopic moment at right angles to the control moment.

The control moment is superimposed on the lift balancing action without interfering with its functioning. Consider the inherent lateral unbalance of lift in a helicopter. The freedom of oscillation of the blades 22 governs the lift of the lateral wings and brings them to equality. This basic equality is maintained even when an increment of lift is added to one control blade and subtracted from the opposite. That is, if the lift increments are reversed, the ensuing rolling moment is exactly equal, though of opposite sign, to the first rolling moment. If the control suspended the balancing action in some degree the aircraft would always roll more readily with the advancing wing ascending because it tends naturally to a higher lift than the retreating wing.

The control blades normally rotate with the tips above the horizontal. In this position the moment about the blade hinge due to the lift is balanced by the centrifugal force which acts above the hinge because the center of gravity of the blade is above the hinge. This method of operating a lifting blade is well known in the art.

Figure 12:
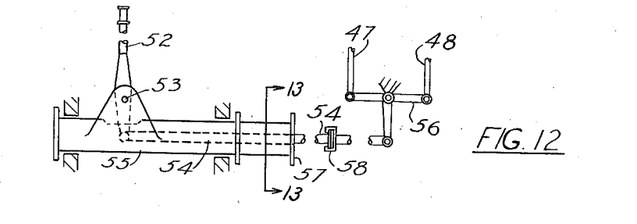
Figure 12 is a side view of the pilot's control shown removed from the aircraft.
Figure 13:
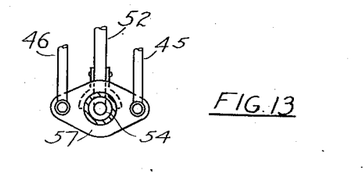
Figure 13 is a section along line 13—13 in Figure 12.

The manual control mechanism for operating the rods to the lever 26 are shown in Figures 12 and 13. It is a conventional form. The control stick 52 is pivoted at 53 and by its oscillation pushes and pulls the tube 54 within the torque tube 55. The tube 54 oscillates the T-crank 56 to which are attached the rods 47 and 48. A lateral movement of the stick rotates the torque tube in suitable bearings and oscillates the arms 57 shown best in Figure 13. To these are attached the rods 45 and 46. A sleeve joint 58 permits the torque tube to turn without twisting the tube 54. If the motions of the stick and lever 26 are traced it will be found that a forward push on the stick tilts the lever 26 down in front which increases the pitch of the control blade, closes valve 33 and decreases the lift of the front wing so that it will dip. Thus the aircraft dives when the stick is pushed forward giving the standard relation between stick and aircraft maneuvers.

In Figure 14 the engine 12 drives the blower 11 by the shaft 59 borne rotatably in the bearings 60. The action is through the overrunning clutch 61 so that the airscrew can not turn the engine. The shaft 59 extends ahead of the airscrew through another overrunning clutch 62. On the end of the shaft is the gear 63 and when the engine is running the gear 63 is not turned. Meshing with gear 63 is a bevel gear 64 on a vertical shaft 65 supported in the bearing 66. At the upper end this shaft has the bevel gear 67 and the spur gear 68. The former meshes with a bevel gear 69 and the latter with the hub gear 70.

If the engine fails the wings are rotated by the relative wind and turn the blower 11 but not the engine. The torque to rotate the blower 11 is very small because it is rotated at a very high speed in contrast to the speed of the wing system, which if driven would have a low speed and high torque. By relieving the wings of the engine torque more energy is available for the blower and the directional control to be described.

Directional control should be dependent on the wing system so that the control may be operated by the wings independently of the engine functioning. In Figure 14 the gear 70 turning the shaft 65 turns the bevel gears 66 and 69. The shaft 71 then turns the propeller 72 by means of helical gears 73 and 74. The rotation of the propeller will create a thrust to be used to direct the aircraft. The propeller is adjustable in pitch and the blades of symmetrical airfoil section are set in the hub so that the adjustment is from zero pitch to plus and minus values. I need not describe the mechanism because adjustable pitch propellers are well known and are available commercially. The important fact is that with a very small propeller a sufficient torque is available to direct the fuselage axis in any direction, even in descent because then the wings in their autorotation drive the propeller. The pilot controls the pitch of the propeller by the pedals 75 and cable 76 running over the pulleys 77 to the control lever of the adjustment mechanism. A cable 78 joins 76 at 76a and runs to the rudder horn 79 so that the rudder is operated simultaneously with the propeller 63.

When the engine is functioning the flow out the upper slots in the wings augments the effective angle of attack because the oncoming flow of air receives an upward component of velocity as is well known in the science of aerodynamics. This upflow is equivalent to increasing the pitch of the wings which is desirable for vertical ascent. If the engine fails air is still thrown by centrifugal force and the blower 11 out the slots. This pitch corresponds to the proper angles of attack of the wings to provide autorotation for the wings so that a sufficient lift is generated to land the aircraft safely. The control blades still continue to function by governing the flow through the wings and the manual control is still operative. The dihedral angle δ at which the wings are arranged, Figure 1, introduces a stabilizing effect just as it does in fixed wing aircraft.

From the preceding disclosures it will now be apparent that the aircraft can be tilted in any direction under complete control and balance as regards both lift and gyroscopic moments, as a function of the lift on the rotatable wings, without regard to whether the aircraft is in horizontal or vertical flight, up or down.

Some moments on the wing system may be classed as transverse moments because they are transverse to the plane of rotation. The terms upsetting and righting moments or tilting moments are applicable to any kind of rotating wing system in any fashion and are therefore more general.

The unique features which I have related provide an aircraft that is an organic whole.

The method of rotative drive provides an economical means of propulsion, provides simple transverse control and balance against lift and gyroscopic moments in conjunction with the functioning of the rotatable wing. Because the drive of the wings is adequate without producing a reactive torque the directional control is economical and may be made to depend on the wings. The sub units are organic or cooperative: for although the best efficiency occurs with $V_j=1.44V$ it is to be understood that the efficiency will still be satisfactorily high for values of $V_j$ somewhat larger or smaller than $2V$. This is essentially true since the curve of efficiency is quite flat near the maximum value. It is not necessary to define the exact limits to $V_j$ itself, since $A_j$ is defined to cover the range of normal operation. Ordinarily it would not be desirable to alter $A_j$ for each condition of flight. It is also better to have $A_j$ large because with improvement in boundary layer energization the best velocity will tend to be smaller.

It is also to be understood that I do not limit myself to a single slot in either upper or lower surfaces of the wing. A plurality of slots can readily be used.

I prefer to use wing sections having upper and lower contours generated by a radius of increasing length from nose to trailing edge of the section. The lower contour could have a reversal in the sense of the radius as when the contour changes from convex to concave, in which case the center of arc changes from one side to the other of the contour involved. A convex under surface is then one having the center or centers of arc above the lower contour of the wing section for substantially the full length of the wing section; a convex upper contour has the center of arc below the upper contour.

A convex wing is especially valuable since even for a positive angle of attack or positive (upward) lift of the wing a tangent to the undersurface at the trailing edge or near to it is directed upward with respect to the relative wind. This means that the jet finally has an upward component in leaving the wing so that a negative lift is created from the mass deflection as well as from the negative circulation described earlier. As shown in Figure 6 the axis $4b$ of the slot is directed substantially along the wing surface just aft of the slot. To achieve this direction to the flow from the slot its sides should overlap.

Figure 1b illustrates the proper form of the discharge slot. The side walls of the slot should overlap to such an extent that the line $18a$ of steepest direction of discharge does not make too large an angle β with the line $18b$ tangent to the wing surface at the slot exit. Thus the angle β should not exceed 45 degrees preferably.

I provide upper and lower surface openings but I am careful to prohibit direct communication between these openings. On the underside of the wing the pressure can rise to relatively high positive values referred to the atmospheric pressure, while on the upper surface the pressure can be quite low or negative. Communication between the upper and lower surface openings would reduce the ratio of lift to drag for the wing because of the tendency to equalize the pressures.

It is also desirable to have a wing nose substantially closed and of smooth contour so that the relative wind will cling to the wing surface for a sufficient distance that the jet from the slot can influence the wind and restrain it from leaving the surface improperly. It is to be understood however that slot in the nose proportioned for use in energizing the boundary layer is permissible. Such openings would be of the order of one-half to six per cent of the chord length. Openings of the order of one-half the thickness of the wing if extensive along a large portion of the span would destroy the flow so that the function of the discharge slot would be destroyed. Thus a wing can be said to have a substantially closed nose if the vertical or chordwise extent or the width of the nose opening is less than one-half the wing thickness and the total spanwise extent is not substantially greater than a chord length. Openings are especially undesirable when they are directed directly into the relative wind.

Any body bathed in a relative flow of fluid and giving rise to a fluid-dynamic force transverse to the general direction of flow may be regarded as a wing.

The type of propulsion used makes possible the first helicopter which has all the necessary structure for controlled flight, namely for motion along any or all three space axes and for control about all axes whether the aircraft is moving or hovering. In hovering flight the idea of low pressure jet propulsion for the wings makes possible direct lift rotary winged aircraft and the provision of directional control by a propeller small enough to be mounted on the aircraft and rotated by the sustaining wings.

While I have described the application of the various devices to a wing system rotating about an upright axis it is to be understood that I do not limit myself to this construction only but intend to claim broadly its application to all rotative wing systems and certain features are applicable to any aircraft. It will also be obvious that modifications and substitutions may be made in the specific forms without departing from the spirit and scope of this invention which is defined in the appended claims.

I claim:

1. In an aircraft, in combination, a direct lift system to sustain the aircraft including a wing rotatable about an upright axis, said wing having a passage within and a perforated surface to form a rearward directed discharge opening or openings in communication with the wing passage, and propulsive means to rotate said wing with a low pressure jet so that a practical efficiency is attained comprising a propulsive means of blowing in communication with the wing passage to deliver fluid thereto at a total pressure equal to or less than 13 pounds per square inch gage, the area of said discharge opening or openings having a value lying between $$A_i = A(0.01 + 0.01t)\left(\frac{1}{3} + \frac{N}{3} - \frac{t}{2}\right)$$

for $N=1$, and $$A_i = A\left\{\frac{16\pi}{3R} + [0.01 + 0.01t + 0.1t^2]\left(\frac{1}{3} - \frac{t}{2}\right)\right\}$$

the area of the chordwise section of said passage at the narrowest section at the axis end of the wing being not less than fifty per cent of the said discharge area employed.

2. In an aircraft, in combination, a wing having a spanwise passage within and a perforated surface to form a rearward directed discharge slot in communication with the wing passage and rotatable about an upright axis to support the aircraft, and a principal means of propulsion arranged to rotate the wing by the mass reaction of a low pressure jet comprising a propulsive blower means in communication with the passage through an opening at the inner end of the wing to discharge a fluid jet from said discharge slot, said blower means creating within the wing a total pressure equal to or less than 13 pounds per square inch gage so that the velocity of said jet is low enough to produce a practical propulsive efficiency, said discharge slot having an area lying between $$A_i = A(0.01 + 0.01t)\left(\frac{1}{3} + \frac{N}{3} - \frac{t}{2}\right)$$

for $N=1$
and $$A_i = A\left\{\frac{16}{3R} + [0.01 + 0.01t + 0.1t^2]\left(\frac{1}{3} - \frac{t}{2}\right)\right\}$$

said passage occupying a major portion of the vertical chordwise cross section of said wing at the axis end so that enough air can be discharged from said slot with a low enough velocity to energize the boundary layer and produce a thrust, the mass reaction of said jet constituting the chief propulsive force for rotating said wing.

3. In an aircraft, in combination, a wing to support the aircraft, said wing having a plan form and airfoil section providing such values of the aspect ratio and wing thickness as a fraction of the chord that their product is greater than 0.50 and giving rise to a significant profile drag, said wing having a rearward directed discharge opening with overlapping sides in the forward two-thirds of the surface of the wing for the discharge of fluid along the said surface, a principal means of propulsion comprising a propulsive means of blowing discharging a major portion of its blown fluid at a total pressure less than or equal to 13 pounds per square inch gage into the aircraft interior, means defining a passage between the said means of blowing and the said discharge opening to convey fluid thereto, a major portion of the vertical chordwise cross-sectional area of the wing at its inner end being devoted to said passage, and the area of said discharge opening having a value lying between $$A_i = A\left\{\frac{1.44}{3\pi R} + (0.01 + 0.01t + 0.1t^2)\left(\frac{1}{3} - \frac{t}{2}\right)\right\}$$

and $$A_i = A\left\{\frac{16\pi}{3R} + (0.01 + 0.01t + 0.1t^2)\left(\frac{1}{3} - \frac{t}{2}\right)\right\}$$

said blower means, passage and slot cooperating to discharge enough fluid from the wing to propel it chiefly by the mass reaction of the discharged fluid with a low enough velocity to reduce the said profile drag by boundary layer energization, said jet thus serving the dual purpose of reducing the drag and of creating a thrust to propel the wing.

4. In an aircraft, a wing to support it and rotatable about an upright axis, said wing having a spanwise passage within, and a principal means to rotate the wing with a low pressure jet so as to achieve a practical efficiency comprising a propulsive means of blowing delivering fluid at a total pressure less than 13 pounds per square inch gage into the axis end of said wing which is open to the fluid flow into said wing passage, said passage occupying a major portion of the volume of said wing, said wing having a rearward directed slot in its surface in communication with the wing passage and emitting a fluid jet rearward out of the wing passage to rotate the wing chiefly by mass reaction of the emitted fluid, said wing slot having an area whose value lies between $$A_i = A(0.01 + 0.01t)\left(\frac{1}{3} + \frac{N}{3} - \frac{t}{2}\right)$$

for $N=1$
and $$A_i = A\left\{\frac{16\pi}{3R} + (0.01 + 0.01t + 0.1t^2)\left(\frac{1}{3} - \frac{t}{2}\right)\right\}$$

said passage and slot cooperating to convey sufficient fluid so that the wing can be rotated by a low pressure jet, the mass reaction of said jet constituting the chief propulsive force.

5. In an aircraft, a wing to support it and rotatable about an upright axis, said wing having a spanwise passage within, and a principal means to rotate the wing with a low pressure jet so as to achieve a practical efficiency comprising a propulsive means of blowing delivering fluid at a total pressure less than 13 pounds per square inch gage into the wing passage through the axis end of said wing which is open to the fluid flow through a major portion of the chordwise cross-section of the wing transverse to the wing span, said wing having a rearward directed slot in its surface in communication with the wing passage and emitting a fluid jet rearward out of the wing passage to rotate the wing chiefly by the mass reaction of the emitted fluid, said wing slot having an area less than twice the area of the said vertical chordwise cross-section of the said passage.

6. In an aircraft, in combination, a hollow wing to sustain it and having a rearward directed slot in its surface in communication with the wing interior, and a principal means of propelling the wing through the air comprising a propulsive means of blowing in communication with the wing interior to deliver thereto fluid at a total pressure equal to or less than 13 pounds per square inch gage, said wing being arranged so that the distribution of the relative thickness $t$ along the major portion of the span measured from the center of the aircraft lies between the distributions expressed by the equation:

$$t = \frac{0.014R\left(\frac{1}{3} + \frac{N}{3}\right)\frac{1-X}{1-f}}{1 - 0.14R\frac{1-X}{1-f}\left[\left(\frac{1}{3} + \frac{N}{3}\right) - 0.005\right]}$$

for values of $N$ of 1.0 and 6 respectively, and the area of the discharge opening having a value lying between $$A_i = A(0.01 + 0.01t)\left(\frac{1}{3} + \frac{N}{3} - \frac{t}{2}\right)$$

for $N=1$, and $$A_i = A\left\{\frac{16\pi}{3R} + [0.01 + 0.01t + 0.1t^2]\left(\frac{1}{3} - \frac{t}{2}\right)\right\}$$

and means to guide the fluid out the slot rearward relative to the wing.

7. In an aircraft, in combination, a direct lift system including a hollow wing rotatable about an axis, said wing having a rearward directed slot in its surface in communication with the wing interior, and a principal means of propelling the wing through the air comprising a propulsive means of blowing in communication with the wing interior to deliver thereto fluid at a total pressure equal to or less than 13 pounds per square inch gage, said wing being arranged so that the distribution of the relative thickness $t$ along the major portion of the span lies between the distributions expressed by the equation:

$$t = \frac{0.014R\left(\frac{1}{3}+\frac{N}{3}\right)\frac{1-X}{1-f}}{1-0.14R\frac{1-X}{1-f}\left[\left(\frac{1}{3}+\frac{N}{3}\right)-0.005\right]}$$

for a value of $N$ of 1.00 and 6.0 respectively, and the area of the discharge opening having a value lying between:

$$A_i = A\left\{(0.01+0.01t+0.1t^2)\left(\frac{1}{3}+\frac{N}{3}-\frac{t}{2}\right)\right\}$$

for $N=1$, and $$A_i = A\left\{\frac{16\pi}{3R}+[0.01+0.01t+0.1t^2]\left(\frac{1}{3}-\frac{t}{2}\right)\right\}$$

8. In an aircraft, a direct lift system comprising rotatable wings having hollow interiors and rearward directed slots in the upper and lower surfaces leading out of the wing interiors, means to induce an outward flow through both said slots, and an automatic means to control the slot flows differentially to create transverse moments on the wing system.

9. In an aircraft, in combination, a hollow wing rotatable about an axis and having upper and lower surface slots in communication with the wing interior, means to induce an outward flow through said slots, and automatic means to control the slot flows differentially.

10. In combination, a hollow wing, rotatable about an axis and having perforated upper and lower surfaces to form slots leading out of the wing interior, a propulsive means of blowing to induce a flow through the said slots and means to control the slot flows differentially between upper and lower surface slots, said slots having overlapping sides to direct the said flows rearward more along than normal to the wing section contour and being located in the outer two-thirds of the wing span.

11. In an aircraft, a direct lift system comprising rotatable wings having hollow interiors and upper and lower surface slots both directed rearward and in communication with the wing interiors, means to induce flows through said slots including an outward flow through a lower surface slot and means to control the slot flows differentially both with respect to upper and lower slots of a given wing and in respect to slots in wings on opposite sides of the axis of rotation of said wings.

12. In an aircraft, a direct lift system comprising rotatable hollow wings having upper and lower surface slots in communication with the wing interiors, means to induce a flow through said slots, and automatic means to control the slot flows differentially both with respect to upper and lower slots of a given wing and with respect to slots in wings on opposite sides of the axis of rotation of said wings.

13. In an aircraft subject to upsetting moments rotatable hollow wings to create a direct lift, each wing having a slot in both upper and lower surfaces in communication with the wing interior, a means responsive to upsetting moments acting on the aircraft, means to induce a flow through said slots to alter the lifts of the wings and controlled by said responsive means to govern the flow through the said slots to alter the lifts of the wings to oppose said upsetting moments.

14. In an aircraft, a wing having upper and lower surface slots in communication with the wing interior, controllable means to induce flows of fluid through said slots and a control blade oscillatable about an axis to govern the flow quantity through the slots differentially with respect to upper and lower surface slots in accordance with the oscillations of said blade.

15. In an aircraft, in combination, a wing to support the aircraft, said wing having a span substantially larger than the chord and a thickness such that the profile drag is significant in comparison to the induced drag, said wing having a rearward directed discharge slot in the forward two-thirds of the upper surface with overlapping sides for the discharge of fluid rearward substantially along the said surface, said slot extending along a major portion of the span, a principal means of propulsion comprising a propulsive means of blowing discharging a major portion of its blown fluid at a total pressure less than or equal to 13 pounds per square inch gage into the aircraft interior, said wing having a passage extending spanwise along a substantial portion of the span in communication with the said means of blowing and the said discharge opening to convey fluid thereto, a major portion of the vertical chordwise cross-sectional area of the wing being devoted to said passage, and the area of said discharge slot having a value lying between $$A_i = A\left\{\frac{1.44}{3\pi R}+(0.01+0.01t+0.1t^2)\left(\frac{1}{3}-\frac{t}{2}\right)\right\}$$

and $$A_i = A\left\{\frac{16\pi}{3R}+(0.01+0.01t+0.1t^2)\left(\frac{1}{3}-\frac{t}{2}\right)\right\}$$

said blower means, passage and slots cooperating to discharge enough fluid from the wing to propel it chiefly by the mass reaction of the discharged fluid with a low enough velocity to reduce the said profile drag by boundary layer energization, said jet thus serving the dual purpose of reducing the drag and of creating a thrust to propel the wing.

EDWARD A. STALKER.